Nov. 3, 1942.  F. E. WOLCOTT  2,300,606
COFFEE MAKER
Filed July 26, 1939

INVENTOR
Frank E. Wolcott
By
ATTORNEY

Patented Nov. 3, 1942

2,300,606

UNITED STATES PATENT OFFICE 2,300,606

COFFEE MAKER

Frank E. Wolcott, West Hartford, Conn., assignor to The Silex Company, a corporation of Connecticut Application July 26, 1939, Serial No. 286,603

4 Claims. (Cl. 210—162)

My invention relates to coffee makers.

It has among its objects to provide an improved strainer mechanism for a coffee maker of the vacuum type. A further object of my invention is to provide such an improved strainer mechanism especially adapted to be disposed in and operatively connected to the stem of the upper bowl of such a coffee maker. Other objects of my invention include the provision of an improved strainer mechanism especially adapted to use with a strainer cup and cooperating strainer disc and such a mechanism having improved means for positioning the strainer cup against tilting from its operatable position in the mouth of such a stem. Still another object of my invention is to provide such improved means including improved extension and spring means carried on the cup and cooperating in an improved manner. These and other objects and advantages of my improved construction will, however, hereinafter more fully appear.

In the accompanying drawing, I have shown for purposes of illustration one embodiment which my invention may assume in practice.

Figure 1:
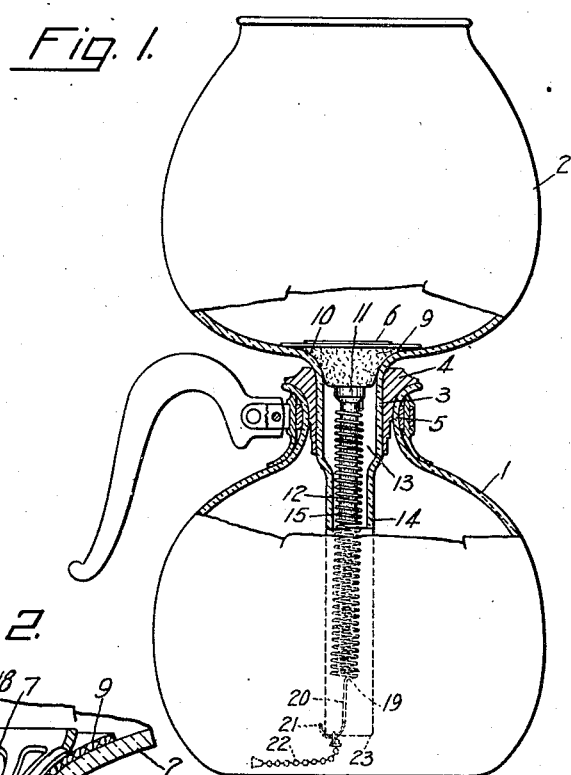
Figure 1 is a side elevation, partially in section, showing a coffee maker equipped with my improvement.
Figure 5:
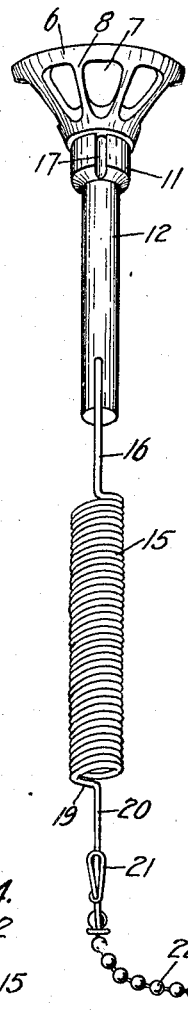
Fig. 5 is a side elevation of the structure shown in Figure 3, the parts being shown in spaced relation ready for assembly.

In this illustrative construction, I have shown a vacuum type coffee maker, including a usual lower bowl 1 and upper bowl 2 and having the stem 3 of the upper bowl extending through a suitable seal 4 in the neck 5 of the lower bowl 1; my improved construction comprising improved straining mechanism disposed in and operatively connected to this stem 3, as hereinafter described.

Referring more particularly to my improved construction, it will be observed that a strainer cup 6 is provided, having a series of radially located apertures 7 in the sloping walls thereof; these apertures herein extending longitudinally and being wider at their upper ends than at their lower ends, and being spaced by narrow intermediate portions or ribs 8. Further, a straining disc 9, formed of fabric or other suitable material, is threaded coaxially on this cup and pressed thereby against the inner walls 10 forming the mouth of the stem 3. Herein, this disc is threaded over a short depending axial extension 11 on the cup 6, and this portion 11 is also provided with an elongated coaxially disposed extension 12 of reduced cross section, herein extending completely through an enlarged portion 13 on the upper end of the stem and into a lower reduced portion 14 thereof. Further, it will be observed that a coiled spring 15 encloses the reduced extension 12 on the cup and has one end connected to the latter while having connections at its opposite end connectible to the lower or free end of the portion 14 of the stem. Herein, the upper end of the spring 15 also has a longitudinally extending extension 16 thereon extending through a suitable vertical opening 17 in the portion 11 leading into the inside of the cup 6, and a transversely bent upper end 18 overlying the bottom of the cup and thus providing an abutment for one end of the spring 15. The other end of the latter also has an inwardly directed portion 19 extending to the axis of the spring coil and a downward extension 20 is provided on this portion and carries on its own lower end a hook 21 equipped with a suitable pull chain 22 and adapted to be hooked over the lower open edge 23 of the stem portion 14 for anchoring the same.

Figure 3:
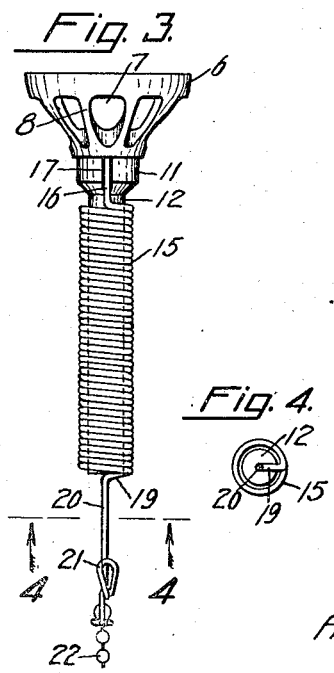
Fig. 3 is a side elevation of my improved strainer mechanism when removed from the bowl.
Figure 4:
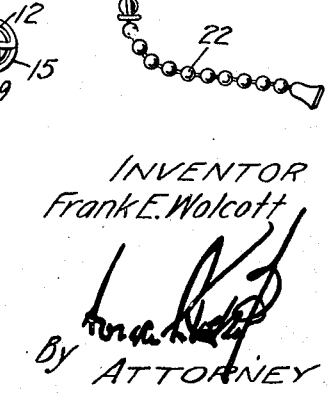
Fig. 4 is a detail sectional view on line 4—4 of Figure 3.

In my improved construction, the coiled spring 15 when free from tension is preferably of substantially the same length as the extension 12 on the cup. Thus, when not in use, the strainer assembly occupies the position shown in Figure 3, with the portion 19 engaging or closely adjacent the lower end of the extension 12, and the closely coiled spring 15 enclosing that extension throughout the length of the latter. When the parts are in this position, it will be evident that the strainer disc 9 may be readily threaded on the assembly, the construction of the parts being such that the usual axial opening in the disc may be readily passed over the pull chain, hook and spring to bring the disc into its operative position beneath the cup. With the disc in this operative position, it will also be evident that the assembly may be readily inserted in the bowl 2 by dropping the chain 22 through the stem 3 from above, the strainer mechanism being then readily connected to the stem by merely pulling down the chain 22 and hooking the hook 21 over the bottom of the stem.

Figure 2:
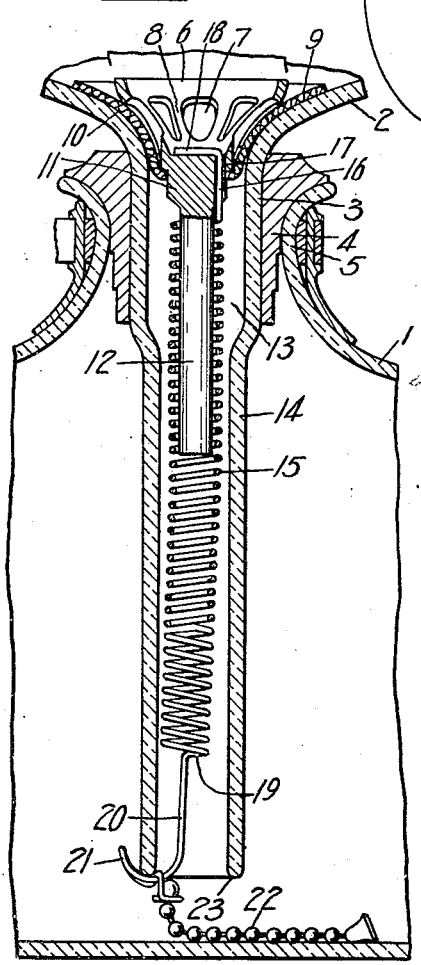
Fig. 2 is a detail enlarged sectional view showing my improved strainer mechanism in position in the upper bowl stem.

In the use of my improved construction, the upper end of the coiled spring 15, i. e. that portion which is disposed around the extension 12 as shown in Figure 2, acts in such manner as securely to locate the cup 6 against tilting from its operative position in the mouth of the stem, wherein it presses the disc 9 against the mouth surface 10. More particularly, the action of the upper end of the coiled spring is such as, while enclosing the extension 12, to exert a substantially straight downward pull on the cup, the extension 12 preventing any substantial swinging movement of the cup laterally relative to the axis of the stem, despite the fact that the lower end of the coiled spring, which when extended projects below the end of the extension 12, is deflected laterally. Thus, despite the connection of the hook 21 over the lower edge of the stem portion 14, the strainer cup and disc are very securely positioned against tilting and in such manner as to insure proper straining of the coffee passing downward after infusion from the infusion bowl 2 to the serving bowl 1. Obviously, the construction is also such as to enable the strainer assembly to be very readily connected or removed whenever desired.

As a result of my improved construction, it is made possible for the coiled spring to cooperate with the depending extension on the cup in an improved manner, not only during use, but when the spring is free from tension. Thus, the coiled spring which herein is telescopically mounted on this extension, has its upper portion enclosing the latter when extended and its lower portion deflected, while, when the spring is not under tension, its whole length is compactly coiled about this extension, herein in such manner as to enable the free end of the latter to provide an abutment for the free end of the spring. If desired, however, the length of the spring may be such that the portion 19 thereon will not engage the end of the extension. In this construction, it is also made possible to form the cup and extension of one piece of material and, if desired, to eliminate metal; the cup and extension, for example, being adapted to be formed of any suitable light molded insulating material such, for example, as "Durez." Attention is further directed to the fact that with my improved apertures 7, the coffee passes quickly from the upper bowl to the lower bowl within the desired time limit without objectionable obstruction by the extension and the spring surrounding the same. These and other advantages of my improved construction will, however, be clearly apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:

1. A strainer device comprising straining means including a member having a depending axial extension, a coiled spring substantially enclosing said extension and connected at one end to said member, said spring extending beyond the free end of said extension and having means at the other end thereof for securing said device in a coffee maker.

2. In coffee straining means including a mechanism for coffee makers, a strainer member having a depending axial extension, a coiled spring substantially enclosing said extension and connected at one end to said member, anchoring means at the other end of said spring for securing said member in a coffee maker, and an abutment on said spring normally engageable with the free end of said extension.

3. In a strainer mechanism for coffee makers having a hollow stem, coffee straining means including a member comprising a cup-shaped portion having a depending axial extension, said member having an opening extending through said cup-shaped portion and adjacent the side of said extension, a coil spring surrounding said extension, said spring having an abutment portion extending through said opening for securing one end of the spring to said member, and means at the opposite end of said spring for connecting the same to the free end of said stem.

4. For a coffee maker bowl having a depending hollow stem, a strainer comprising coffee straining means mechanism including a member seated in the mouth of said stem and having a depending axial extension, a spring connected to said cup and having a coiled portion substantially enclosing said extension and a laterally deflected portion abutting the lower end of said extension, and connecting means on the lower end of said spring for connecting the same to the free end of said stem.

FRANK E. WOLCOTT.